United States Patent [19]

Morgan et al.

[11] Patent Number: 5,096,769
[45] Date of Patent: Mar. 17, 1992

[54] STRENGTHENED CERAMIC

[75] Inventors: Glenn Morgan; James C. Welborn, Jr., both of Laurens, S.C.

[73] Assignee: Alsimag Technical Ceramics, Inc., Laurens, S.C.

[21] Appl. No.: 376,814

[22] Filed: Jul. 7, 1989

[51] Int. Cl.5 ................................ B32B 7/02
[52] U.S. Cl. ............................ 428/212; 174/152 GM; 403/29; 403/30; 428/375; 428/379; 428/415; 428/416; 428/457; 428/458; 428/472; 445/7
[58] Field of Search ............... 428/469, 457, 458, 375, 428/472, 34.5, 34.6, 34.7, 212, 379, 415, 416; 445/7; 174/152 GM; 403/29, 30

[56] References Cited

U.S. PATENT DOCUMENTS

| | | | |
|---|---|---|---|
| 4,485,150 | 11/1984 | Tsuno | 428/472 |
| 4,532,179 | 7/1985 | Takami et al. | 428/469 |
| 4,613,549 | 9/1986 | Tanaka | 428/469 |
| 4,797,319 | 1/1989 | Yoshida et al. | 428/469 |

Primary Examiner—Merrell C. Cashion, Jr.
Assistant Examiner—D. S. Nakarani
Attorney, Agent, or Firm—Bailey & Hardaway

[57] ABSTRACT

A strengthened article formed from a ceramic having a bore through a portion thereof and with a metal rod adhered by heat-settable adhesive to the ceramic within the bore thereof. The metal rod has a greater coefficient of thermal expansion than the ceramic thereby placing this ceramic in compression upon heat setting and cooling of the overall article.

3 Claims, 2 Drawing Sheets

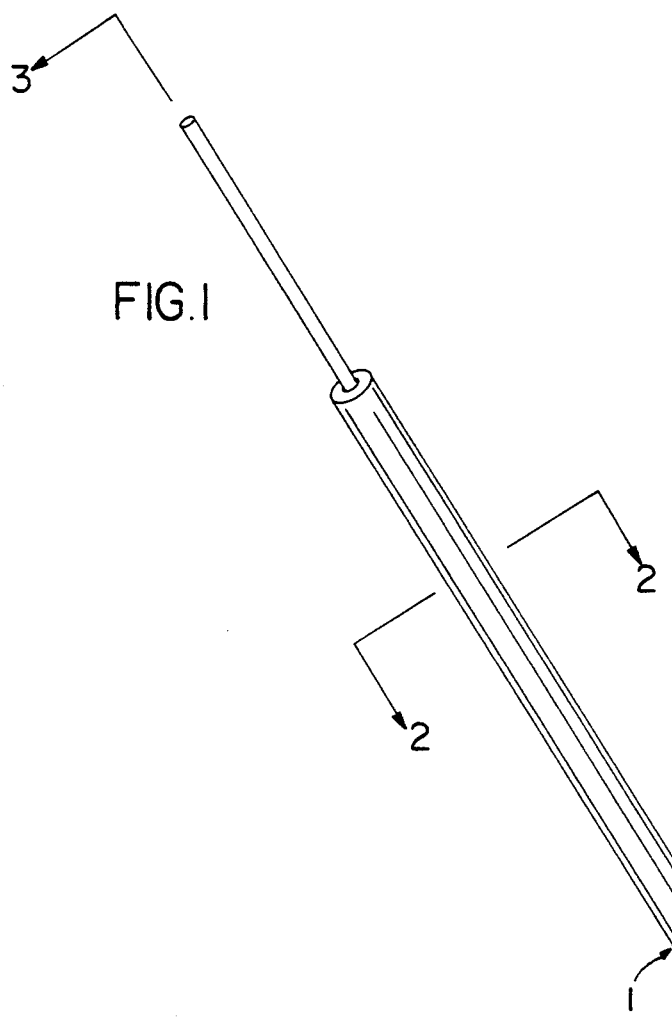
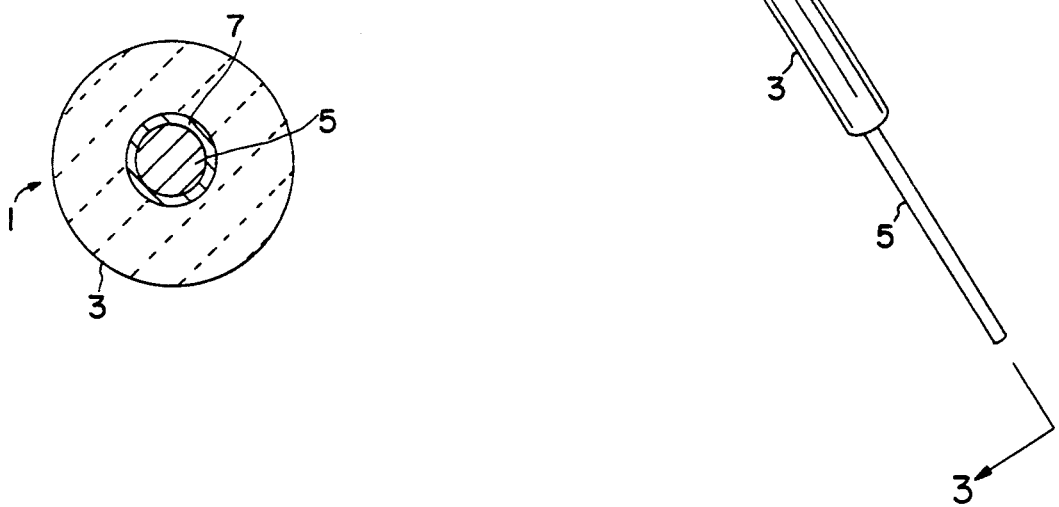

STRENGTHENED CERAMIC

BACKGROUND 0 THE INVENTION

This invention relates generally to the art of ceramics and, more particularly, to a strengthened ceramic article.

In the area of metal ceramic composites, various cermets have been produced in order to take advantage of the beneficial properties of both metals and ceramics. This has been done with a mixture of beneficial results.

Various metallic articles have been coated with ceramics for the purpose of protecting the metallic article. This is commonly done in the area of porcelain enamels.

There, however, has never been a method devised to strengthen ceramic articles where a pure ceramic surface must always be exposed. This is true, particularly when the surface is elongated.

SUMMARY OF THE INVENTION

It is thus an object of this invention to provide a novel ceramic article.

It is a further object of this invention to provide a novel and strengthened ceramic article which may withstand greater tinsel forces than the ceramic article could withstand if not so strengthened.

It is a more particular and further object of this invention to provide a novel ceramic article which is not only strengthened but which has greater resistance to shattering than the ceramic article by itself would have.

These as well as other objects are accomplished by a strengthened article formed from a ceramic having a bore through a portion thereof and with a metal rod adhered by heat-settable adhesive to the ceramic within the bore thereof. The metal rod has a greater coefficient of thermal expansion than the ceramic thereby placing this ceramic in compression upon heat setting and cooling of the overall article.

BRIEF DESCRIPTION OF THE DRAWINGS

FIG. 1 of the drawings illustrates in perspective view an article in accordance with this invention.

FIG. 2 of the drawings is a cross-sectional view along the line 2—2 to FIG. 1.

DETAILED DESCRIPTION

Figure 3:
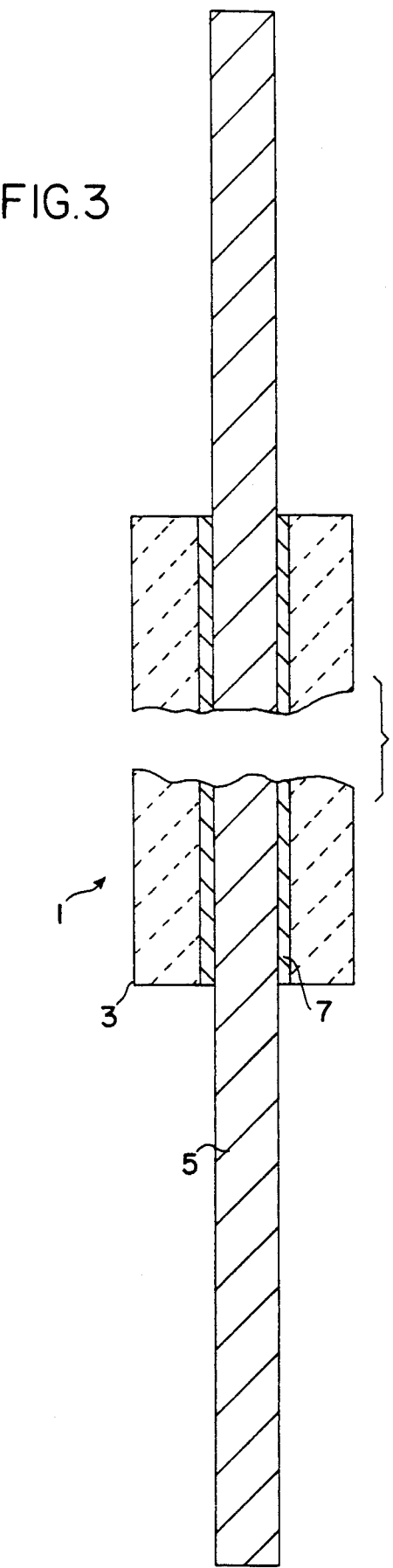
FIG. 3 of the drawings is a cross-sectional view along the line 3—3 of FIG. 1.

In accordance with this invention, it has been found that a ceramic article may be significantly strengthened by placing a bore through the ceramic article and placing within the bore a metal rod having a greater coefficient of thermal expansion than that of the ceramic article. Since the metal rod has a greater coefficient of thermal expansion than the ceramic material upon cooling after heat setting, the metal rod will have a tendency to shrink more than the ceramic. The ceramic will thereby be placed into compression and given an increased strength as it relates to sustaining tension forces. Tension is the mode in which ceramics normally fail.

In addition to strengthening the ceramic article, the overall article has the ability to withstand fragmentation upon fracture due to the adhesion to the metal rod. The article thus produced has utility in many areas such as knife sharpeners and yarn guides in the textile industry. Various other advantages and features will become apparent from a reading of the following description given with reference to the various figures of drawing.

FIG. 1 of the drawing illustrates an article 1 in accordance with this invention which shows a ceramic 3 on the exterior thereof with a metallic rod 5 passing through the center thereof.

FIGS. 2 and 3 are, respectively, cross-sectional views along the lines 2—2 and 3—3 of FIG. 1 which better illustrate the cross section of the article.

Referring to FIG. 2 of the drawings the metal rod 5 is adhered to the ceramic 3 by a heat-settable adhesive 7. The metal rod 5 has a greater coefficient of thermal expansion in the ceramic 3 such that upon cooling, the metal rod 5 has a tendency to shrink more than the ceramic 3. This phenomenon is taken advantage of in the process of this invention upon the heat setting of the heat-settable adhesive 7.

The heat-settable adhesive is a thermal setting polymer such as the epoxy resins made from epichlorohydrin and bisphenol-A which are described in *The Condensed Chemical Dictionary*. These resins normally set at temperatures within the range of 200° to 300° F. Thus, upon heating to the heat set temperature of the heat-settable adhesive, both the ceramic 3 and metal rod 5 expand. However, because of its greater coefficient of thermal expansion, the metal rod 5 expands more than the ceramic 3. Upon heat setting of the heat-settable adhesive 7, the metal rod 5 becomes adhered to the ceramic 3. Upon cooling to room temperature the metal rod 5 has a tendency to shrink more than the ceramic 3. The ceramic 3 is thereby placed into compression thus enhancing the ability of the ceramic to withstand tensile forces.

In addition to providing a strengthened ceramic article, the adhesion of the ceramic to the metal rod prevents fragmentation of the ceramic in the event of failure. This is particularly significant in the presence of high speed equipment such as textile machinery due to the hazards which would otherwise be associated with fragmentation of a ceramic.

The ceramic material of this invention may be any of the conventional ceramic materials such as those formed from clays as well as the purer materials such as aluminum oxide, magnesium oxide, silicon oxide and the rare earth oxides, as well as thorium oxide and zirconium oxides.

The metal rod may be of any metallic material which has a coefficient of expansion which is greater than that of the ceramic material to which it is adhered. Since the metallic rod is isolated from the environment by the ceramic material, the metal rod is preferably formed of a steel but, of course, may be formed of more exotic materials.

It is thus seen that the article of this invention provides a strengthened ceramic article. It is further seen that the strengthened ceramic article has greater ability to withstand tensile forces as well as to avoid fragmentation in the event of failure. As the foregoing description has been exemplary in nature, many variations will become apparent to those of skill in the art. Such variations, however, are embodied within the spirit and scope of the following appended claims.

That which is claimed is:

1. A strengthened article, comprising:
   a ceramic article having a bore through a portion thereof;
   a metal rod passing through said bore;

a heat-settable polymer adhesive bonded directly to said metal rod and bounded directly to said ceramic article adhering said metal rod to said ceramic article;

said metal rod having a greater coefficient of thermal expansion than said ceramic article whereby upon heat setting of said heat-settable adhesive and cooling to room temperature, said ceramic article is placed in compression and the metal rod is placed in tension thus strengthening said article.

2. The strengthened article in accordance with claim 1 wherein said ceramic article is a sintered ceramic article formed from a material selected from the group consisting of aluminum oxide, silicon oxide, magnesium oxide, rare earth oxides, thoriumoxide, zirconium oxide and mixtures thereof.

3. The strengthened article in accordance with claim 1 wherein said metal rod is a steel rod.

* * * * *